United States Patent [19]

Shaw

[11] 4,002,518
[45] Jan. 11, 1977

[54] HELICALLY FLUTED DEEP HOLE CATHODE AND METHOD OF MAKING SAME

[75] Inventor: Richard H. Shaw, Hampden, Mass.
[73] Assignee: United Technologies Corporation, Hartford, Conn.
[22] Filed: Jan. 16, 1975
[21] Appl. No.: 541,668

Related U.S. Application Data

[62] Division of Ser. No. 455,839, March 28, 1974, Pat. No. 3,880,745.
[52] U.S. Cl. ............................ 156/154; 29/456; 29/592; 57/162; 156/297; 427/77; 427/105; 427/355; 427/410
[51] Int. Cl.² ................. B32B 5/08; B32B 31/16
[58] Field of Search .............. 204/224 M, 290 R; 29/592, 456, 458, 460; 57/7, 162; 156/153, 172, 169, 280, 297, 195, 154; 427/401, 409, 410, 77, 105, 355; 138/131, 143–145, 149

[56] References Cited

UNITED STATES PATENTS

| | | | |
|---|---|---|---|
| 1,329,630 | 2/1920 | Reinhold | 57/162 |
| 1,457,295 | 6/1923 | Bado | 138/143 |
| 1,946,603 | 2/1934 | Von-Wedel | 29/456 |
| 3,120,482 | 2/1964 | Williams | 204/224 M |
| 3,152,618 | 10/1964 | Rothermel et al. | 156/143 |
| 3,240,645 | 3/1966 | Friedwald et al. | 156/195 |
| 3,243,365 | 3/1966 | Aikin | 204/290 R |
| 3,485,744 | 10/1969 | Schaffner | 204/290 R |
| 3,671,348 | 6/1972 | Kemsey-Bourne | 156/195 |
| 3,696,014 | 10/1972 | Goodard et al. | 204/212 |
| 3,795,604 | 3/1974 | McKinney et al. | 204/224 M |
| 3,880,745 | 4/1975 | Shaw | 204/290 R |

*Primary Examiner*—Charles E. Van Horn
*Assistant Examiner*—Basil J. Lewris
*Attorney, Agent, or Firm*—Vernon F. Hauschild

[57] ABSTRACT

A helically fluted deep hole cathode which is fabricated by helically winding at least one thread member around a dielectrically coated cathode tube and then applying a layer of electrical insulation over the tube and thread member so wound and wherein, preferably, the helical flutes commence about the distance of the diameter of the electrode tip from the tip and are selectively formed or machined after forming to have a flute diameter approximately .001 inch to .002 inch smaller than the diameter of the hole to be cut so that the flutes support the electrodes in the deep hole during the cutting operation and provide an egress route for the electrolyte and removed workpiece material to depart the hole area during the hole drilling process.

5 Claims, 4 Drawing Figures

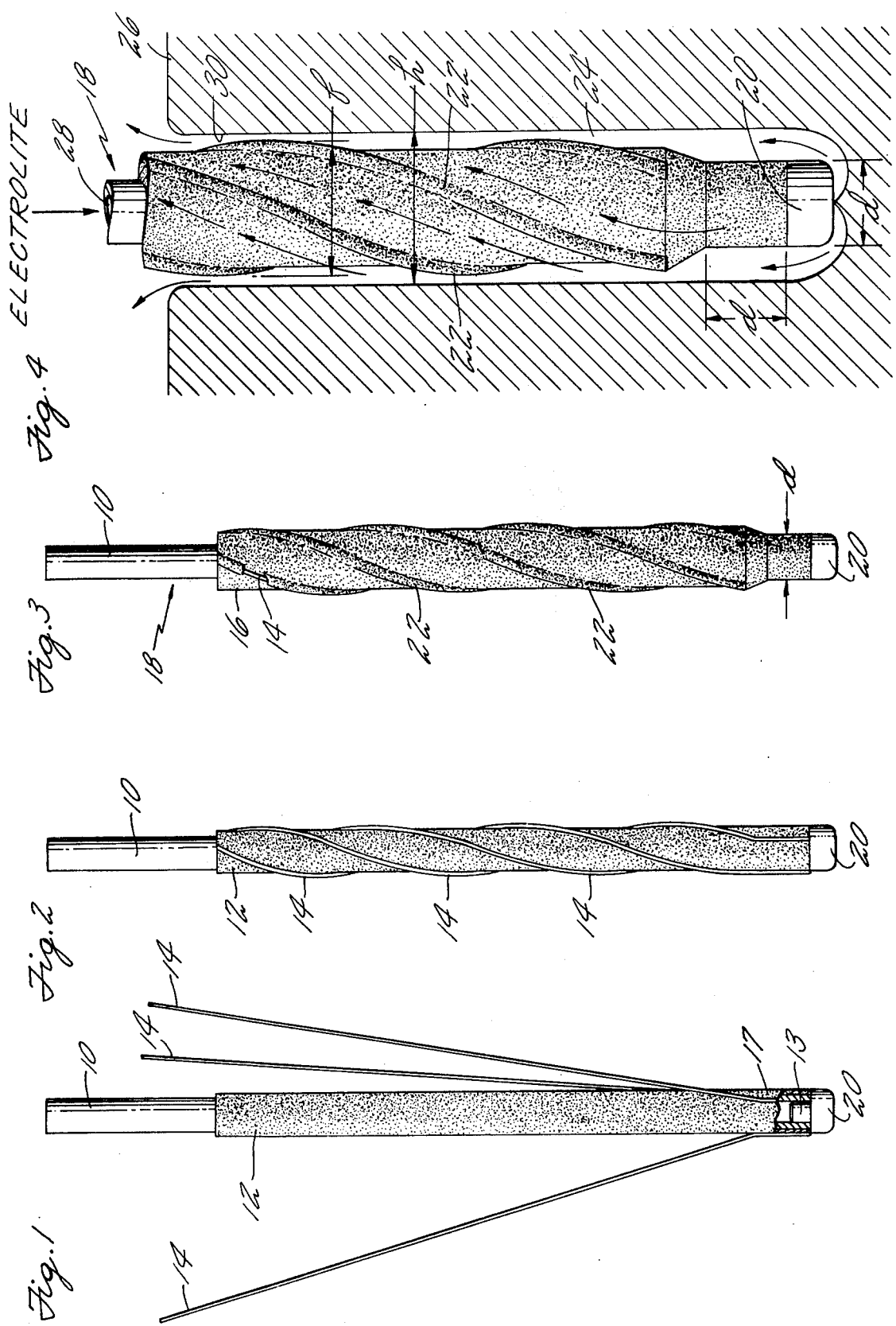

HELICALLY FLUTED DEEP HOLE CATHODE AND METHOD OF MAKING SAME

CROSS-REFERENCE TO RELATED PATENT

This is a divisional application from U.S. Patent Application Ser. No. 455,839 filed Mar. 28, 1974, now U.S. Pat. No. 3,880,745.

BACKGROUND OF THE INVENTION

1. Field of Invention

This invention relates to cathodes for electrochemical drilling of holes having a substantial depth-to-diameter ratio, as much as 150 to 1, and more particularly to such a cathode having electrically insulating helical flutes on the exterior thereof to support the electrode in the hole being drilled and to provide an egress route for the electrolyte and remoted workpiece material. To make the cathode, flutes are formed by wrapping threadlike members helically around the exterior of the cathode tube and coating the tube and threadlike members so wound with an insulating layer to connect the helically wound thread members to the tube and form a helically fluted cathode of selected flute diameter.

2. Description of the Prior Art

The electrochemical drilling art includes cathodes of many different shapes including those taught in U.S. Pat. Nos. 3,708,404; 3,714,018; 3,285,844; 3,647,674 and 3,748,252 but none of these are helically fluted for the purpose taught herein. While Crawford et al U.S. Pat. No. 3,271,288 shows cathodes with a projection therefrom, it should be borne in mind that these are uninsulated projections used to form threads in the part being drilled as the cathode rotates in the workpiece hole.

SUMMARY OF THE INVENTION

A primary object of the present invention is to provide a helically fluted deep holed cathode which is supported within the hole walls during deep hole drilling operation and which provides egress routes for the electrolyte and removed workpiece material.

It is a further object of this invention to teach such a cathode which is capable of drilling holes in a workpiece of a substantial depth-to-depth diameter ratio, as much as 150 to 1, while providing support for the cathode within the deep hole throughout the electrical drilling operation because the helically fluted portion of the cathode has a diameter approximately 0.001 inch to 0.002 inch smaller than the diameter of the hole being chemically drilled. Further, the cathode has a cathode tip of selected diameter and the flutes commence approximately one tip diameter from the tip to permit a preferred egress route for the electrolyte and removed material.

It is still a further object of this invention to teach the method of fabricating such a helically fluted deep hole cathode wherein one or more threadlike members are wound helically onto an electrically conductive cathode tube having a dielectric coating or layer thereon and wherein an insulating layer covers both the cathode tube and the helically wound threadlike members to form a helically fluted deep hole cathode.

It is still a further object of this invention to teach such a cathode which is capable of producing a straighter and more uniform hole than usually attained with holes of the depth-to-diameter ratio.

Other objects and advantages of the present invention may be seen by referring to the following description and claims, read in conjunction with the accompanying drawings.

BRIEF DESCRIPTION OF THE DRAWINGS

FIG. 1 is a showing of a dielectrically coated metallic cathode tube with a plurality of nonconductive threadlike members connected to one end thereof in preparation for being helically wound therearound.

FIG. 2 is a showing of such a cathode tube with the threadlike members so helically wound and connected at their opposite ends to the opposite end of the dielectrically coated cathode tube.

FIG. 3 is a showing of a cathode tube with a coating of electrical insulation material applied over the cathode tube and the helically wound thread members to form a helically fluted cathode tube with a cathode tip at its work end.

FIG. 4 is a showing of my helically fluted cathode tube positioned in the workpiece hole which it is drilling.

DESCRIPTION OF THE PREFERRED EMBODIMENT

Although this invention is directed both to the cathode per se and its method of manufacture, the method of manufacture will be described first.

Viewing FIG. 1 we see metallic and conductive cathode tube 10, which may be made of Be Cu (beryllium copper) or titanium, and which is hollow so as to conduct electrolyte to the tip of the cathode which is electrochemically drilling the workpiece. The electrochemical drilling process is well known per se and will not be described herein in detail. The process is an arrangement which provides for the support of a workpiece and an electrode in a configuration such that the electrode can be advanced toward and into the workpiece at a controlled rate as material is electrolytically removed from the workpiece. An electrolyte is supplied under pressure to the interface between the electrode working end or tip and the workpiece by way of a passage through the electrode, and the workpiece and electrode are connected into a low potential, high amperage capacity, direct current circuit, such that the electrode is cathodic relative to the workpiece.

A dielectric layer or coating 12 envelops the cathode to electrically insulate it. At least one and preferably a plurality of nonconductive threadlike members, such as nylon thread 14, are connected in any convenient fashion, such as adhesive, to one end of the coated electrode tube as shown at station 17 so that the threadlike members 14 are substantially equally spaced circumferentially about the coated tube 10. These threadlike members are then helically wound, maintaining their circumferential spacing, around and for the length of the coated portion 12 of cathode tube 10 as best shown in FIG. 2 and are secured to the opposite end of FIG. 10 in any fashion, such as by an adhesive. Cathode tip 20 is attached to stem 15 which is press fitted or otherwise connected to the bore of cathode tube 10. The coated cathode with the helically wound threadlike members 14 thereon shown in FIG. 2 has a layer of electrically insulating material, such as epoxy material, applied to the exterior thereof, possibly by dipping or spraying or in other conventional fashion, and preferably with the interior of tube 10 blocked off.

Coating 16 connects threadlike members 14 to cathode tube 10. The tube so coated with insulating layer 16 is shown in FIG. 3. It is highly desirable that the cathode flute diameter be within 0.001 to 0.002 inch of the hole diameter to be electrochemically drilled with fluted cathode 18 shown in FIG. 3 and therefore the diameter of tube 10, the thickness of coating 12, the diameter of threads 14 and the thickness of insulating coating 16 are selected or controlled so that the flute diameter is of selected dimension. In the alternative, the fluted cathode 18 shown in FIG. 3 may have the flute diameter machined to desired diameter. Since cathode head 20, which is preferably of about 0.005 inch thickness or depth, has a diameter $d$ greater than the diameter of tube 10, by machining, all coating 16 may be removed from tip 20, while leaving the insulated tube 10 at diameter $d$, between tip 20 and threads 14. In the alternative, tube 10 could have been undercut as in my U.S. Pat. No. 3,714,018. In addition, it is preferable that the cathode flutes 22, formed by threadlike members 14 and coating 16, commence approximately one tip diameter distance $d$ from tip 20.

Referring to FIG. 4 we see fluted cathode 18 in the hole 24 which it is electrochemically drilling in workpiece 26, which may be of any conventional conductive material. As best shown in FIG. 4, the cathode flute outer diameter $f$ is preferably approximately 0.001 inch to 0.002 inch less than the desired hole diameter $h$. It will be seen from the FIG. 4 construction that the electrolyte, which may be chlorides or acid solution, proceeds in the direction shown by the arrow through the interior 28 of fluted cathode 18 and is discharged from tip 20 to form the electric contact between cathode 18 and the workpiece 26 as required by conventional electrochemical drilling. It is also preferable that the electrode diameter $d$ at tip 20 be approximately 0.004 inch smaller than the major diameter $f$ of the flute so that the electrolyte being projected through tip 20 will thereafter flow smoothly between the flutes 22 of electrode 18 and through the egress path formed between electrode 18 and hole wall surface 30 so that no striations are formed on wall surface 30. In view of the close clearance previously described between cathode 18 and wall 30 of hole 24, cathode 18 can enter hole 24 and move therewithin without dragging and cathode 18 is actually guided or supported within hole 24 so that tip 20 will not come into contact with wall 30 of hole 24 due to any vibration common to holes of the particular depth-to-diameter ratio being drilled, thereby preventing any sparkouts or shorting of the system. It will be evident to those skilled in the art that holes of any depth-to-diameter ratio may be successfully electrochemically drilled with this cathode and that straight holes of uniform diameter with a depth-to-diameter ratio as high as 150 to 1 would not be uncommon.

I wish it to be understood that I do not desire to be limited to the exact details of construction shown and described, for obvious modifications will occur to a person skilled in the art.

I claim:

1. The method of producing a hollow cathode for use in electrochemical drilling deep holes of small diameter in a workpiece comprising the steps of:
    A. providing a conductive metal cathode tube having an exterior dielectric coating of selected thickness,
    B. attaching a plurality of threadlike members to one end of the cathode tube at substantially equally spaced circumferential stations therearound,
    C. helically winding the threadlike members around and toward the other end of the cathode tube while maintaining the circumferential spacing to form helical flutes around the tube,
    D. securing the other ends of the threadlike members to the other end of the cathode tube,
    E. applying an insulating layer over the exterior of the cathode tube and helically wound threadlike members to produce a helically fluted cathode tube with an electrically insulated exterior, and
    F. providing an electrode tip of selected diameter at one end of the cathode tube.

2. The method of producing a hollow cathode for use in electrochemical drilling deep holes of small diameter in a workpiece comprising the steps of:
    A. providing a conductive metal cathode tube having an exterior dielectric coating of selected thickness,
    B. attaching a plurality of threadlike members to one end of the cathode tube at substantially equally spaced circumferential stations therearound,
    C. helically winding the threadlike members around and toward the other end of the cathode tube while maintaining the circumferential spacing to form helical flutes around the tube,
    D. securing the other ends of the threadlike members to the other end of the cathode tube,
    E. applying an insulating layer over the exterior of the cathode tube and the helically wound threadlike members to produce a helically fluted cathode tube with an electrically insulated exterior, and
    F. providing an electrode tip of selected diameter at one end of the cathode tube so that the threadlike members and hence the helical flutes are spaced one electrode tip diameter from the electrode tip.

3. The method according to claim 2 wherein the diameter of the cathode tube with dielectric coating and the threadlike members are of selected diameter and wherein the thickness of the insulating layer is controlled so that the fluted cathode portion will be approximately 0.001 inch to 0.002 inch smaller than the diameter of the hole to be cut by the cathode.

4. The method according to claim 2 wherein the insulating layer is machined after application to produce a selected diameter of the helically fluted portion of the cathode tube.

5. The method according to claim 4 wherein the selected diameter of the helically fluted portion of the cathode tube is about 0.004 inch larger than the cathode tip diameter.

* * * * *